United States Patent
Tsykora

(10) Patent No.: US 7,681,122 B1
(45) Date of Patent: Mar. 16, 2010

(54) FILE CONVERSION SYSTEM AND METHOD

(75) Inventor: Anatoliy V. Tsykora, Waltham, MA (US)

(73) Assignee: VistaPrint Technologies Limited, Hamilton (BM)

( * ) Notice: Subject to any disclaimer, the term of this patent is extended or adjusted under 35 U.S.C. 154(b) by 1482 days.

(21) Appl. No.: 10/288,749

(22) Filed: Nov. 6, 2002

(51) Int. Cl.
*G06F 17/00* (2006.01)

(52) U.S. Cl. .................... 715/249; 715/255

(58) Field of Classification Search ............. 715/524, 715/523, 530, 249, 250, 255
See application file for complete search history.

(56) References Cited

U.S. PATENT DOCUMENTS

| | | | | |
|---|---|---|---|---|
| 5,608,651 | A * | 3/1997 | Leavy et al. | 348/14.12 |
| 6,292,842 | B1 * | 9/2001 | Crouch et al. | 719/329 |
| 6,370,560 | B1 * | 4/2002 | Robertazzi et al. | 718/105 |
| 6,429,947 | B1 * | 8/2002 | Laverty et al. | 358/1.15 |
| 6,898,601 | B2 * | 5/2005 | Amado et al. | 707/10 |
| 6,901,403 | B1 * | 5/2005 | Bata et al. | 707/101 |
| 2001/0028364 | A1 * | 10/2001 | Fredell et al. | 345/751 |
| 2002/0120792 | A1 * | 8/2002 | Blair et al. | 709/330 |
| 2002/0154342 | A1 * | 10/2002 | Haining | 358/474 |
| 2003/0234942 | A1 * | 12/2003 | Jeran | 358/1.9 |

OTHER PUBLICATIONS

Crovella, Mark E., et al, "Task Assignemnt in a Distributed System (Extended Abstract): Improving Performance by Unbalancing Load", ACM SIGMETRICS Performance Evaluation Review, vol. 26, Issue 1, Jun. 1998, pp. 268-269.*
Luo, Mon-Yen, et al, "Web and E-Business Application: Content Management on Server Farm with Layer-7 Routing", Proceedings of the 2002 ACM Symposium on Applied Computing, Mar. 2002, pp. 1134-1139.*
The American Heritage College Dictionary, Fourth Edition, Houghton Mifflin Company, 2002, pp. 1142.*

* cited by examiner

*Primary Examiner*—Laurie Ries
(74) *Attorney, Agent, or Firm*—Robert L. Dulaney; Jessica J. Costa

(57) ABSTRACT

A flexible and scalable file format conversion system is capable of supporting a number of contemporaneous conversion requests. For each file, a conversion request entry and one or more related conversion task entries are maintained in FIFO queues under the control of a distribution manager program. Conversion operations are handled by application programs under the control of associated graphical processor programs. Conversion tasks are assigned to graphical processors by the distribution manager based on the conversion capabilities of the associated application program. The uploaded files received from clients for conversion are stored in a shared folder pending access by the assigned graphical processor. The graphical processors have a uniform interface with the queues and the memory. The results of the processing are stored in the shared folder where they are subsequently accessed by the web server and transmitted back to the client.

25 Claims, 4 Drawing Sheets

Upload your files

The file formats we accept are: — 401

- Microsoft Word File (*.doc)
- Microsoft Powerpoint File (*.ppt)
- Adobe Photoshop Image (*.psd) *'
- Bitmap Image (*.bmp)
- GIF Image (*.gif) '*
- JPEG Image (*.jpg,*.jpeg)
- PCX Image Document (*.pcx)
- PICT Image (*.pic)
- PNG Image (*.png) **
- TIF Image Document (*.tif,*.tiff)
- TARGA Image (*.tga,*.vda)
- Adobe PDF - preserves font and vectorial information (*.pdf)
- Adobe Acrobat Document (*.pdf) **

** You may use semi-transparent images with these formats.

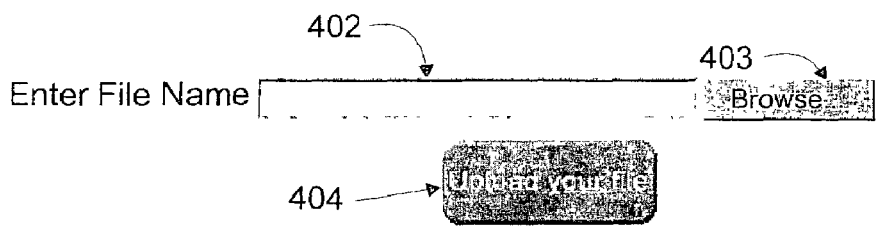

Enter File Name [ 402 ... 403 Browse ]

404 → Upload your file

FIG. 4

FILE CONVERSION SYSTEM AND METHOD

FIELD OF THE INVENTION

The invention relates to a system and method for the automated conversion of electronic files.

BACKGROUND OF THE INVENTION

The widespread availability of the World Wide Web and related data processing and communication technologies have created new ways for businesses to market their products and services to their customers. Among the many new businesses that have taken advantage of the capabilities of the Web are printing service providers. These companies typically allow customers to access a web site, download editing tools to the customer's computer, and design custom content to be printed subsequently on products such as documents, clothing, and promotional goods.

One network-based product design system is disclosed in U.S. Pat. No. 6,247,011 entitled "Computerized Prepress". The patent discloses a downloadable document authoring tool that runs in the client browser. The product created by the client is uploaded to the server where it is processed by a translation program into a prepress file format. Another system is disclosed in co-pending and co-owned U.S. application No. 09/557,571 entitled "Managing Print Jobs", which is hereby incorporated by reference. The system discloses a downloadable editing tool that allows a customer to create and edit custom materials in the customer's browser.

A company desiring to provide flexible and powerful client/server design services that allow a customer to create custom WYSIWYG products in the client's browser would desirably want to provide the user with both the ability to enter, modify and arrange text in the product being created and the ability to incorporate an existing client file, for example, a design, company logo, photograph, or previously prepared text. Providing these features poses several challenges.

For example, the system should desirably be able to accept files from the customer in various file formats in common use today, such as Microsoft Word, Microsoft PowerPoint, Adobe Acrobat, and Adobe Photoshop, as well as Bitmap, GIF, JPEG, PCX, PICT, PNG and TIF, and automatically perform any necessary file conversions to create one or more preview versions, typically in GIF or JPEG format, for review by the customer and a prepress version, typically in PDF format, for later use in printing the customer's product. A prior art system for receiving files and automatically performing conversions under the control of a master program is disclosed in U.S. Pat. No. 6,429,947 entitled "Automated, Hosted Prepress Application".

In addition, it is highly desirable during the design process to display to the client an image of the product that is as close to the appearance of the final printed product as possible. This poses the problem of dealing with the inherent incompatibility between the color rendering abilities of a computer monitor and the abilities of the product printing system. As is well known, computer displays are pixel-based systems that render colors using red, green and blue light (RGB). Most printing systems, by contrast, render colors using inks. Offset printing systems, which are frequently used for high quality, high resolution printing of documents, render colors using cyan, magenta, yellow and black (CMYK). While there is substantial overlap between the RGB color gamut and the CMYK color gamut, the two are not identical. There are certain colors that can be rendered on an RGB computer monitor that cannot be produced on a CMYK system and vice versa. In designing a product on the user's computer, it is possible that a file uploaded for the product by the user will contain colors that cannot be accurately produced on an RGB system. When this happens, computer monitor systems will typically select a substitute RGB color in an attempt to approximate the original CMYK color. In some cases, the substitute RGB color is noticeably different from the color of the original image. Similarly, it is possible that the user will upload a file for the product that contains colors that can be rendered accurately in RGB, but cannot be duplicated with a CYMK system. Both of these situations are undesirable because the result would be a final printed product that differs from the colors of the product image that was viewed and approved by the user during the design process.

Furthermore, a computerized product design system that is available to many customers worldwide faces the problems of dealing with many simultaneous product design sessions and with customers who may be using web browsers that lack the dynamic features and capabilities of current state-of-the-art browsers. It is highly desirable that the system be able to accommodate simultaneous users, including users using older or less capable browsers, while retaining the ability to quickly generate and display an image of the product to users in a manner that represents the appearance of the final printed product as accurately as possible.

Finally, a web-based system, if it meets with success in the marketplace, may need to deal with a rapid increase in the demand for its services. If the system becomes overwhelmed to the point that users experience excessive delays or are unable to access the service at all, customer satisfaction will decline and some may seek alternate sources for their product.

SUMMARY OF THE INVENTION

The present invention addresses these and other problems in the prior art by providing a flexible and scalable system that is capable of supporting a number of contemporaneous file conversion requests. For each uploaded file, a conversion request entry and one or more related conversion task entries are maintained in FIFO queues under the control of a distribution manager program. Tasks associated with the conversion are handled by application programs under the control of associated graphical processor programs, which are assigned conversion tasks by the distribution manager. The uploaded files received from clients for conversion are stored in a shared folder pending access by the assigned graphical processor. The graphical processors have a uniform interface with the queues and the memory. Support is provided for older and less capable browsers. The results of the processing are stored in the shared folder where they are subsequently accessed by the web server and transmitted back to the client.

BRIEF DESCRIPTION OF THE DRAWINGS

FIG. 4 is a depiction of a file upload display.

DESCRIPTION OF THE PREFERRED EMBODIMENT

Figure 1:
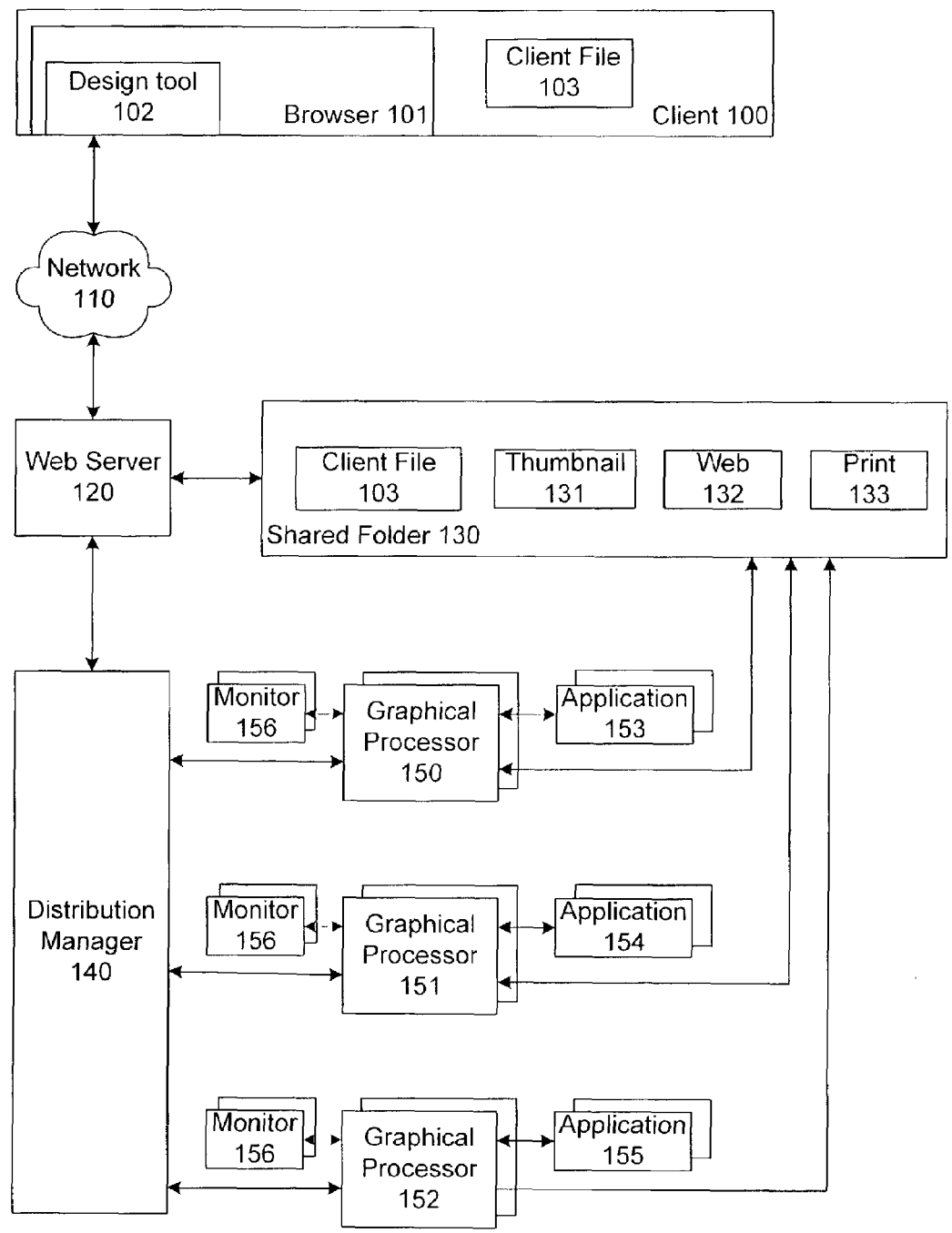
FIG. 1 is a block diagram of a system for file conversion in a network environment.

Referring to FIG. 1, a preferred embodiment of a Web-based product design system embodying the invention is shown. Client 100 accesses web server 120 via network 110. In a preferred embodiment, client 100 is a typically equipped PC or similar computer, but it will be understood that the invention can be employed with other client devices capable of running browser software, such as palmtop computers, tablet computers and web-enabled telephones. A single representative client 100 is shown and discussed for illustration, but it will be understood that a number of geographically dispersed clients of different types can be simultaneously in various stages of interaction with web server 120 via network 110. Network 110 is preferably the Web, but could alternatively be any intranet, extranet, or other network.

Web server 120 is a computer system having a universal resource locator and adapted to be accessed by clients over network 110. While shown in FIG. 1 as a single unit, it will be understood that web server 120 may in fact be comprised of a plurality of individual processors or computers, data storage units, and other equipment, which may be either in the same or in different geographical locations, operating cooperatively so as to provide computational, informational and electronic commerce support to Web users.

When web server 120 is initially accessed client 100, the client is provided with the web site's home page and subsequently may browse though the product offerings. In a preferred embodiment of a custom product creation system, web server 120 provides client 100 with images of a variety of product templates from which the client may choose. In a system for designing documents, these would typically include templates for business cards, postcards, letterhead, labels, brochures, or other printed materials. When client 100 selects a specific template to initiate product creation, Web server 120 downloads the selected template and design tool 102, which in a preferred embodiment will execute in browser 101. Design tool 102 allows the user to enter, arrange and modify text and otherwise create a custom printed product.

To provide the user with the ability to incorporate one or more of the user's pre-existing files into the product being designed, tool 102 provides a file upload feature. In a preferred embodiment, the user initiates the file upload option by clicking a button having a descriptive legend, such as "Upload an image". A drop down menu or other well-known selection technique could be alternatively employed. When a user has indicated a desire to upload an image, tool 102 displays an upload screen to the user. Referring to FIG. 4, the file upload screen displays list 401 informing the user of the file formats that web site 120 will accept for uploading. As discussed below, web server 120 will modify list 401 from time to time as necessary to reflect the current operational status of the system.

The screen provides name field 402 for the user to enter the name of the desired file. Alternatively, the user may initiate a search in the client 100 file system for the desired file by clicking Browse button 403. When the desired file has been located, the user initiates the upload to web server 120 by clicking "Upload your file" button 404. For the purpose of this discussion, file 103 is depicted as residing on client 100, but it will be understood that the file could reside on and be retrieved from another computer system or storage device that is accessible by client 100. The operation and features of the file upload screen are implemented using well-known capabilities of a modern browser 101.

Web server 120 is in communication with distribution manager program 140 and with an area of data storage identified as shared folder 130. As discussed in more detail below, distribution manager 140 acts as the central receiving and distribution point for all file conversion tasks and all browser capture tasks. Distribution manager 140 receives file conversion requests and browser capture requests from web server 120 and manages the distribution of the requests among a plurality of graphical processor programs (GPs). In the embodiment shown in FIG. 1, three types of GPs are employed, identified as GP 150-152. GPs 150 and 151 are adapted to retrieve a conversion task from queue 142 and the associated file from shared storage 140, handle the interaction with an associated application program 153 and 154, and store the converted file back in shared folder 130. Applications 153 and 154 are commercially available programs capable of performing the types of file conversions necessary to support the operation of the system. For example, in a preferred embodiment, application 153 is an image-editing product, such as Photoshop from Adobe Systems Incorporated. Application 154 is a word processing and presentation graphics product, such as Office XP from Microsoft.

Preferably, browser 101 is a recent version of a popular web browser, such as Microsoft Internet Explorer or Netscape, that supports DHTML operations and features. In such a browser, tool 102 allows the user to dynamically create, edit and view, in the user's browser, the content and components of the product being designed. However, not all Web users have these browsers. Some users are using older browser versions or browsers from vendors that do not provide this support. With browsers that do not support DHTML features, the customer's product creation and editing cannot be rendered on the customer's display by the browser and must, therefore, be processed by the server. Application 155 is a browser program compatible with browser 101 and capable of rendering the document being viewed by the user of client 100. GP 152 and application 155 provide server-side product rendering for customers using browsers that cannot support the rendering capability of tool 102 in the browser.

The system is designed to be modular, flexible, and scalable. As customer demand for services increases, additional GPs of one or more types can be activated. Similarly, during periods of lesser demand underused or surplus GPs can be deactivated. Each newly activated GP would control another instance of its associated application program. While three types of GPs 150-152 are shown in FIG. 1, it will be understood that, since all GPs interface with DM 140 in a standard fashion, additional types of GPs could be readily added to handle the conversion of new or different file formats or to support new or different file conversion applications. For redundancy and improved performance, there preferably are multiple instances of each type of GP and application. In summary, the system can be expanded, both in terms of the types of GPs and the number of GPs within a type, to flexibly accommodate customer demands and the availability of new suitable application programs.

No specific hardware system or structure is required to implement the invention. For example, each GP program could be running on a different computer or multiple GPs could be running on a single computer. The number of computer systems employed in a specific embodiment of the system would typically be a function of factors such as system workload, processing power of the hardware employed, operating system constraints, and the level of hardware redundancy desired. In a preferred embodiment, the distribution manager program 140, which is not a heavy consumer of computing resources, is running on a computer system with one of the GPs. Alternatively, DM 140 could be running on web server 120 or on a completely different computer system (not shown). Each GP 150 and 151 has read and write access to shared folder 130. As discussed below, in a preferred embodiment where the XHTML product description is obtained by GP 152 from DM 140 and not from shared folder 130, GP 152 has write access to shared folder 130, but does not require read access. While shared folder 130 is depicted as a single block, it will be understood that shared memory 130 represents a virtual area of addressable memory that may exist on one or more physical data storage devices. It is not required that client file 103, thumbnail 131, web 132 and print 133 be stored in contiguous memory locations or on the same hardware device.

Each GP is checked by a monitor program 156 to verify that the GP is still actively executing tasks. In a preferred embodiment, monitor 156 periodically checks for updating of a timestamp by the GP. Other known techniques of activity monitoring could alternatively be employed. If monitor 156 does not detect the appropriate updating of the timestamp, monitor 156 assumes that the associated GP is no longer operational. When a failed GP is detected, monitor 156 instructs the operating system of the computer system on which the GP is running to terminate the failed GP program and start another instance of the GP. While FIG. 1 shows a monitor 156 for each GP, this need not be the case in all embodiments. In a preferred embodiment, there would be one monitor 156 per computer system. If multiple GPs are running on a single computer system, they would all be monitored by a single monitor program 156.

DM 140 is also monitoring the operational status of the GPs. For each GP, DM 140 monitors the time that has passed since the GP last requested a new task. If the elapsed time for a GP exceeds a maximum time-out value, DM 140 will treat the GP as having failed and will remove that GP from capabilities 143, thereby preventing other tasks in queue 142 from being assigned to it. DM 140 will also change the status of any task currently assigned to that GP to make that task available for selection by another GP having the appropriate capabilities. In this manner, a system having multiple GPs of each GP type can sustain a GP failure while still providing support to customers and without loss of or significant delay in completing any task assigned to the failed GP at the time of failure.

If it happens that at the time of failure the failed GP was the only GP performing a particular type of conversion, DM 140 will notify web server 120 that the system is unable to process the associated file formats. In response to the notification from DM 140, web server 120 will generate a new file upload screen with the formats that can no longer be converted removed from list 401. When the ability to convert those formats is recovered, DM 140 will notify web server 120 and web server 120 will again generate a new screen to restore those file formats to list 401.

When the user has selected the desired file and indicated that the user wants the file to be uploaded by clicking button 404, browser 101 will locate and forward the requested file to web server 120. Web server 120 will then initiate the creation of an appropriate Active Server Page (ASP) for transmission back to client 100. The processes and procedures for generating ASPs and the transferring of files over the Web are well known in the art.

Before web server 120 can assemble the page information to display an image of the uploaded file at client 100, client file 103 must be appropriately converted. The file conversion includes both removing any inappropriate colors and generating preview and prepress versions of the file in the appropriate format and resolution. As discussed above, to provide a truly WYSIWYG service to customers, it is important that the product colors displayed to the user on the client 100 display be as close as possible to the colors rendered on the finished product. The system will, therefore, perform the conversions necessary to replace any color that cannot be rendered on both the client 100 display and the printing system with the closest suitable approximation of that color. In the disclosed embodiment, regardless of the original colors of client file 103, only colors that can be both viewed on the RGB monitor of client 100 and printed on a CMYK printing system are displayed to the user of client 100.

The system will accept uploaded files that may be in RGB, CMYK or possibly another color system and will generate a version in CMYK for subsequent use in printing one and one or more versions of the file in RGB for viewing by the user. In a preferred embodiment, this is accomplished by GP 150 using application 153 to first open the file in CMYK, then convert the CMYK version to an RGB version, and then convert the RGB version back to CMYK. Other sequences could also be employed, such as opening uploaded files initially in RGB, then converting to CMYK and then back to RGB. In this way, all colors not reproducible in both color systems are removed before the converted files are stored in shared folder 130. This means that in some circumstances the image as ultimately printed will not have precisely the same colors as the original image file that was uploaded the client 100, but it has the advantage of insuring that the user is presented during the design process with an accurate image of the finished product and avoids the possibility of user dissatisfaction that could result from showing the user an image of one color and subsequently printing a different color on the final product. If the user is not satisfied with the displayed colors resulting from the file conversion, the user is free to terminate the design process prior to ordering the product.

In a preferred embodiment, three versions of uploaded client file 103 are created, identified in FIG. 1 as thumbnail 131, web 132 and print 133. These can be thought of as relatively low resolution, medium resolution and high resolution versions of the client file. Thumbnail 131 and web 132 are RGB images designed for viewing on the client 100 display at a typical resolution of 72 pixels per inch. Thumbnail 131 is a relatively small image intended for quick file identification and selection. In a preferred embodiment, thumbnail 131 is sized to be 100 pixels in the longest dimension. Web 132 is a larger version showing the file image in greater detail. Thumbnail 131 and web 132 will typically be stored in JPEG format or, if transparency support is required, in GIF format.

Print 133 is the CMYK version of the file intended for use in the subsequent printing process, not for viewing by the user of client 100. Print 133 is stored in PDF format at a resolution of 300 dpi. In some cases, the print 133 file will never be required. For example, a user may decide to modify the image after viewing it or may decide not to complete the product purchase process. To avoid processing that in some cases will turn out to have been unnecessary, instead of performing the complete PDF generation process at this time, print 133 could contain a preliminary version of the file that is ready for final PDF processing. The generation of the final PDF print version print 133 could be postponed until a later time, for example until after the user has actually placed an order for the product or until just prior to printing.

Figure 2:
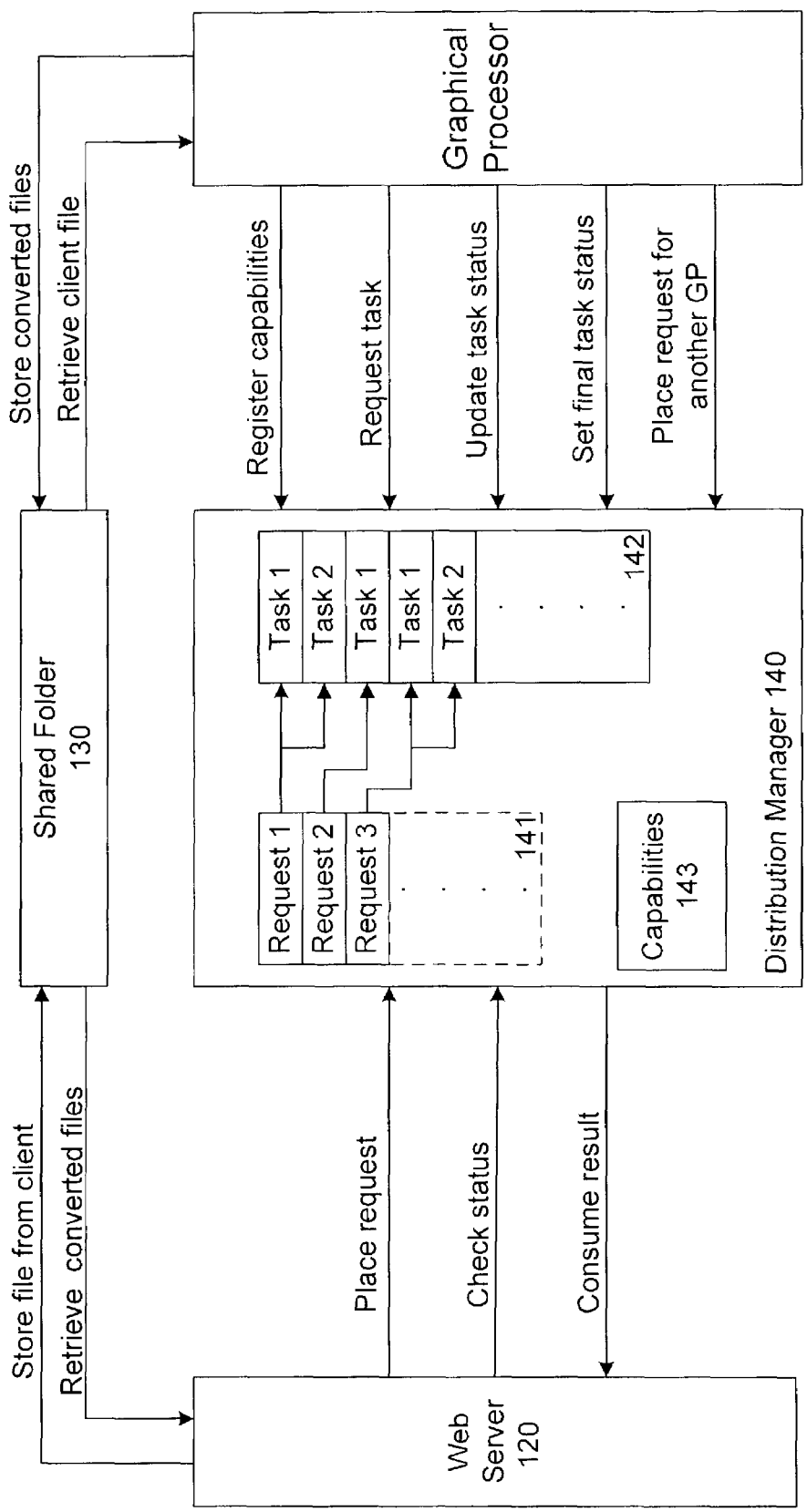
FIG. 2 is a more detailed diagram of a portion of FIG. 1.
Figure 3:
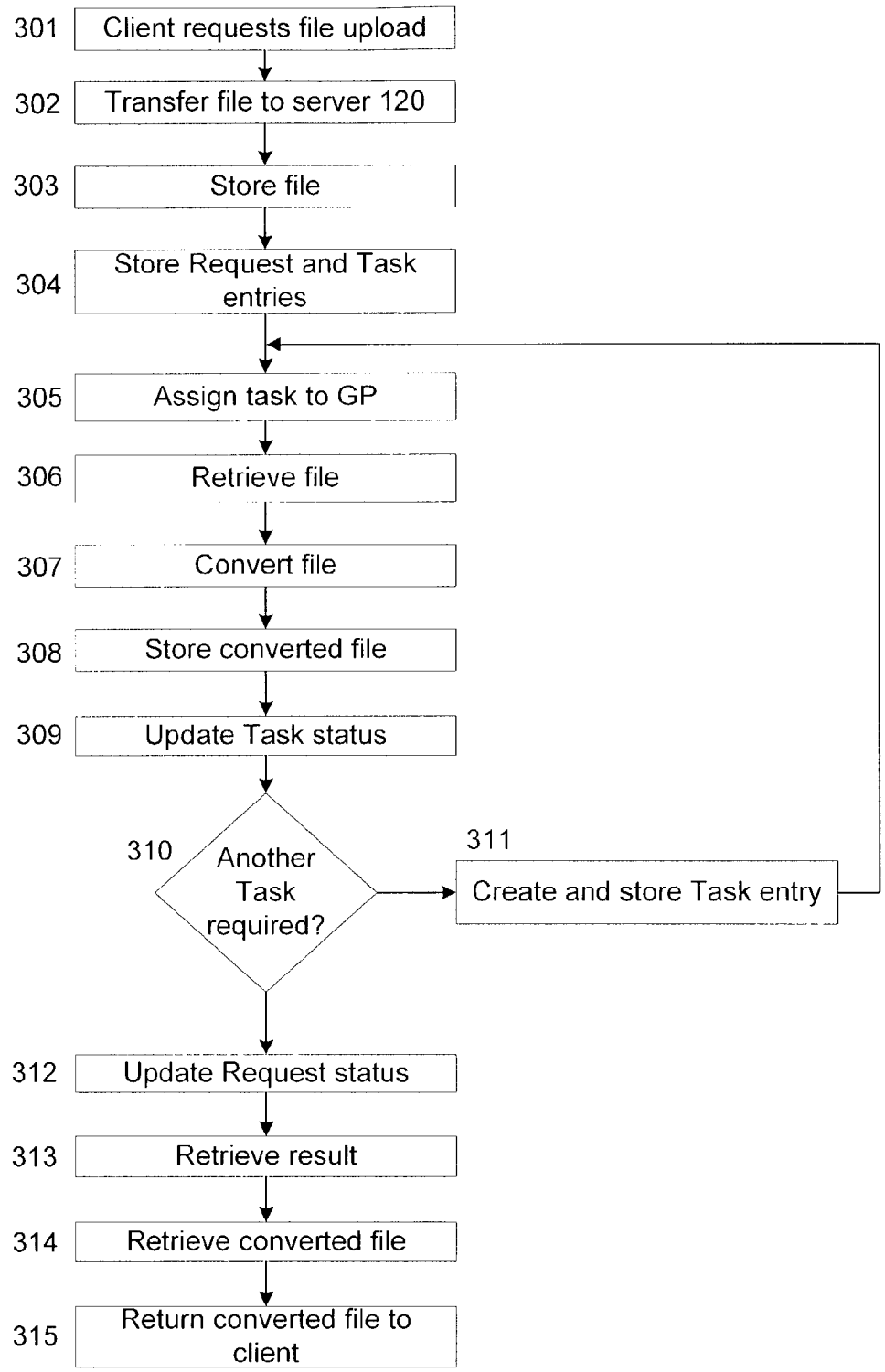
FIG. 3 is a flow diagram illustrating the operation of the invention.

Referring to FIG. 2 and FIG. 3, the operation of a preferred embodiment of the invention will be discussed. While the following operational discussion addresses the operation of file uploading and conversion involving GPs 150 and 151, it will be understood that substantially similar activities occur when GP 152 is engaged in a "browser capture" operation. A summary of the operational differences involved in the browser capture operation is given at the conclusion of the following discussion.

As mentioned above, the invention is designed to handle a number of clients contemporaneously accessing server 120 and submitting file conversion requests. The process for format conversion of a file is depicted in FIG. 3. At step 301, the user initiates the uploading of a selected file, in the disclosed embodiment by clicking button 404 as discussed above. The file is transferred to web server 120 at step 302 and stored by web server 120 in shared folder 130 at step 303. Based on the format of the uploaded file, at step 304 Web server 120 then creates, and forwards to DM 140, a request entry and one or more tasks entries associated with the uploaded file. Each request entry is stored in first in, first out (FIFO) queue 141 and contains the information needed to locate the stored file in shared folder 130 and a unique request ID associated with client 100. Each task entry is stored in FIFO queue 142 and contains an identification of the specific conversion to be performed and a unique task ID associated with the request ID. Some uploaded files may require only a single conversion task and others may require multiple tasks. Tasks are typically independent processes that can be performed without coordination with the other tasks from the same request. For example, if client file 103 is a multi-page word processing document, each page of the document would typically be treated as a separate individual task. It is not required that every task within a request be handled by the same GP or be performed in a specific sequence. In a system having multiple GPs capable of performing the same types of conversions, it is likely that multiple GPs will be involved in completing a single multi-task request, thus reducing the amount of time necessary to complete the request. While a single request queue 141 and a single task queue 142 are employed in a preferred embodiment, DM 140 could be implemented with multiple request or task queues, for example a separate task queue for each type of GP.

Each operational GP has a unique GP ID. As a part of the initiation process for a newly activated GP, the GP will register its capabilities with DM 140. DM 140 maintains a Capabilities 143 data structure indicating the file conversion capabilities of each operational GP. The capabilities of a GP reflect the types of file conversions that the GP's associated application is capable of performing. As each GP completes a task and is ready to begin work on another, the GP will request that DM 140 assign a task to it. DM 140 will check the capabilities of the requesting GP in Capabilities 143 and at step 305 will assign to the GP the next available task in queue 142 that corresponds to the capability of that GP. For each task that has been assigned, DM 140 will store an indication of which GP is handling that task. Because DM 140 does not assign a task to a GP until the GP asks for it when the GP is available, the system inherently will balance the processing load among all GPs capable of handling each type of task.

At step 306, the GP assigned the task will retrieve the associated client file 103 from shared folder 130 and control the associated application to accomplish the required conversion at step 307. As mentioned above, in a preferred embodiment, applications 153 and 154 are commercially available software products with documented input and output formats and procedures. Each GP uses a standard interface and procedure in interacting with DM 140, shared folder 130 and monitor 156. In each GP's interactions with its associated application, the GP is adapted to provide inputs and commands to, and receive the outputs from, the application in the manner required by that particular application.

When the conversion is complete, the GP will store the converted file in shared folder 130 at step 308 and appropriately update the task status in DM 140 at step 309. In some cases, the output of one GP will require further conversion by another GP. For example, a file in Microsoft Word format would first go to a GP associated with appropriate Microsoft word processing program, such as a GP associated with the Microsoft Office XP application, where the Word file would be converted to PDF format. The first GP would then store the PDF file in shared folder 130 as print file 133 and create a new task entry in task queue 142. At step 311, the new task would be associated with the same request entry in request queue 141, thereby placing the task at or near the top of queue 142. The next available GP running an image processing application, such as Adobe Photoshop, would then receive the task of converting the PDF file into the thumbnail and web file versions, which would be stored in shared folder 130 as thumbnail 131 and web 132. When all tasks associated with a request have been completed, the request status is appropriately updated at step 312.

Because the process may take a few seconds to complete, in a preferred embodiment web server 120 will periodically check the status of the pending request in queue 141 and display a visual indication of task progress to the user. As an alternate embodiment, rather than web server 120 repetitively checking request status, the interaction between web server 120 and DM 140 could be implemented such that web server 120 waits for DM 140 to generate a notification message to web server 120 that the request has been completed. In this case, since incremental status information is not available to web server 120, the user could be shown a generic visual moving design to assure the user that the system is working on a response. When a request is identified as being completed, web server will read the queue 141 entry, which gives web server 120 the information necessary to retrieve the converted files from shared folder 130. In a preferred embodiment, web server 120 is also provided the size of the converted files.

At step 314, web server 120 retrieves the appropriate file from shared folder 120 and transmits it to client 100 at step 315. In a preferred embodiment, web server initially retrieves only thumbnail 131 for transfer to client 100. If the user views thumbnail 131 and subsequently indicates a desire to use the image in the document, web server 120 will retrieve and transfer web version 132.

The operation of GP 152 and application 155 regarding browsers 101 that do not support DHTML features involves similar, but not identical steps. When a customer is using a browser that does not support XHTML, tool 102 will perform a "browser capture" operation. Tool 102 will receive the product edit requests from the user, create an XHTML description of the user's product incorporating the user's edits, and forward the description to web server 120 for processing. Web server 120 receives the product description and creates a request entry for queue 141 and a task entry for queue 142. The received XHTML document description is generally relatively small compared with the typical client file 103 and, in a preferred embodiment, the XHTML document description is embedded into the queue 142 task entry and not stored as a separate file in shared folder 130. When GP 152 is assigned a task by DM 140, GP 152 retrieves the task entry including the product description, provides the product description to application 155 for rendering, captures a bitmap of the rendered image, stores the image as a JPEG image in shared folder 130, and updates the task status to indicate that it has been completed. No thumbnail version is required or produced in the browser capture case.

Completed request and task entries will remain in queues 141 and 142 until DM 140 receives an indication from web server 120 that the requested file has been successfully transmitted to client 100. Converted files will remain available in shared folder 130 for a period determined by the printing services supplier, generally based on available storage capacity and business considerations. For example, a potential customer who uploaded a file, but did not complete a product purchase, may have been interrupted or delayed for various reasons. The printing service may choose to retain the file for a period of days or weeks before deleting it, in case the customer returns. If an uploaded file has been incorporated into a product that was purchased, the printing service provider may choose to retain the file for a much longer period in anticipation of the customer reordering the same product again in the future.

One preferred embodiment of the invention has been shown and described and various alternative methods and structures for other embodiments have been mentioned, but the foregoing description is to be considered in all aspects as illustrative rather than restrictive. The scope of the invention is as indicated in the following claims and all equivalent methods and apparatus.

What is claimed is:

1. A system for managing contemporaneous conversions of a plurality of files uploaded to the system by a plurality of users from a plurality of user computers, the system comprising:

a memory, a web server adapted to receive a file uploaded by a user over a computer network store the received file in the memory, receive a converted version of the file from the memory, and transmit the converted version to the user computer for displaying to the user, a conversion task distribution manager having a request queue containing a request entry for each received file for which conversion has not been completed and a task queue containing at least one conversion task entry for each request entry in the request queue, a plurality of file format conversion applications, and a plurality of graphical processors, each graphical processor being operatively connected to the distribution manager, the memory, and a conversion application and adapted to receive a conversion task from the distribution manager, retrieve the file associated with the conversion task from the memory, control a conversion application to create a converted version of the file, and store the converted version in the memory.

2. The system of claim 1 wherein the distribution manager assigns a conversion task to a graphical processor in response to an indication from the graphical processor that the graphical processor is not currently performing a conversion task and is ready to receive a conversion task.

3. The system of claim 1 further comprising at least one graphical processor status monitor in communication with the graphical processors.

4. The system of claim 3 wherein the at least one monitor requests the initiation of a new instance of a graphical processor upon determining that the current instance of the graphical processor has failed.

5. The system of claim 1 wherein the converted version is a display version of the received file for transmission to the user computer for viewing by the user and wherein the display version is created such that any colors in the received file that are not suitable for rendering with both a user computer color display and a color printing system are replaced in the at least one display version with colors that are suitable for rendering with both a user computer color display and a color printing system.

6. The system of claim 5 wherein the color display is an RGB display and the color printing system is a CMYK printing system.

7. The system of claim 1 further comprising one or more graphical processors for controlling the conversion applications to create at least one prepress version of the received file such that any colors in the received file that are not suitable for rendering with both a user computer color display and a color printing system are replaced in the prepress version with colors that are suitable for rendering with both a user computer color display and a color printing system.

8. The system of claim 1 wherein one or more of the graphical processors are further adapted to create a new conversion task entry for entry into the task queue, the new task entry identifying an additional conversation task to be performed on a file.

9. A computer-implemented method for performing contemporaneous conversions of electronic files uploaded by a plurality of users from a plurality of user computers, each file being in one of a plurality of supported formats, the method comprising:

receiving a file from a user over a computer network, storing the file in a memory, determining one or more format conversion tasks to be performed to create at least a display version of the file for displaying to the user, creating a conversion request entry for the file, the request entry having at least an identifier of the user computer that supplied the file, creating at least one conversion task entry for the file, each conversion task entry being associated with the conversion request entry for the file and having at least an identifier of a conversion task to be performed, maintaining a plurality of graphical processors, each graphical processor being adapted to control a conversion application to perform at least one type of conversion operation, maintaining a conversion request queue containing a request entry for each received file for which conversion has not been completed, maintaining a conversion task queue containing at least one conversion task entry for each request entry in the request queue, selecting a conversion task entry from the task queue, assigning the conversion task associated with the selected entry to a graphical processor, the graphical processor controlling a conversion application to create a converted version of the file and storing the converted version in the memory, and retrieving from the memory a converted version that is a display version of the received file and transmitting the retrieved converted version to the user computer for displaying to the user.

10. The method of claim 9 further comprising updating the selected conversion task entry to indicate that the associated task has been assigned to a graphical processor.

11. The method of claim 9 further comprising updating the conversion task entry to indicate that the associated task has been completed.

12. The method of claim 9 wherein the queue entries associated with a file are retained at least until an indication is received that the display version was received at the user computer.

13. The method of claim 12 further comprising, if a graphical processor is identified as failed, initiating another instance of the graphics processor.

14. The method of claim 9 further comprising, if creation of at least a display version of the file requires the performance of a plurality of sequential conversion tasks, after completion of a first conversion task, creating a new conversion task entry containing at least an identifier of a further conversion task to be performed and adding the new conversion task entry to the conversion task queue.

15. The method of claim 9 further comprising monitoring the plurality of graphical processors to determine if one or more graphical processors have failed.

16. The method of claim 15 wherein a processor is identified as failed if it fails to request assignment of a task within a predetermined period of time.

17. The method of claim 15 wherein a processor is identified as failed if it is determined to be inactive.

18. The method of claim 15 further comprising, if a graphical processor with an assigned conversion task is identified as failed, changing the conversion task entry associated with that conversion task to make that conversion task available for assignment to another graphical processor.

19. The method of claim 9 further comprising providing for displaying to the users of the user computers a list of file formats that will be received from the user computers, the list being based on the currently available conversion capabilities of the plurality of graphical processors and being automatically modified to add file formats to the list when new file conversion abilities are added and to delete file formats from the list when conversion abilities are not currently supported.

20. The method of claim 9 wherein the display version is created such that any colors in the received file that are not suitable for rendering with both a user computer color display and a color printing system are replaced in the display version with colors that are suitable for rendering in both a user computer color display and a color printing system.

21. The method of claim 20 wherein the color display is an RGB display and the color printing system is a CMYK printing system.

22. The method of claim 9 further comprising creating at least one prepress version of the file such that any colors in the received file that are not suitable for rendering with both a user computer color display and a color printing system are replaced in the at least one prepress version with colors that are suitable for rendering in both the user computer color display and a color printing system.

23. The method of claim 22 wherein the color display is an RGB display and the color printing system is a CMYK printing system.

24. One or more computer-readable media having embodied therein computer program code for performing the method of claim 9.

25. A system for performing contemporaneous format conversions on electronic files received from a plurality of user computers, the system comprising:
one or more processors; and
one or more computer readable media having embodied therein computer code which, when executed by the one or more processros, implements the method of claim 9.

* * * * *